United States Patent
Gil

(10) Patent No.: US 7,149,221 B2
(45) Date of Patent: Dec. 12, 2006

(54) APPARATUS AND METHODS FOR INCREASING BANDWIDTH IN AN INFINIBAND SWITCH

(75) Inventor: Mercedes E. Gil, For Collins, CO (US)

(73) Assignee: Palau Acquisition Corporation (Delaware), Santa Clara, CA (US)

(*) Notice: Subject to any disclaimer, the term of this patent is extended or adjusted under 35 U.S.C. 154(b) by 993 days.

(21) Appl. No.: 10/160,793

(22) Filed: May 31, 2002

(65) Prior Publication Data

US 2003/0223435 A1   Dec. 4, 2003

(51) Int. Cl.
*H04L 12/28* (2006.01)

(52) U.S. Cl. ........................ 370/400; 370/412

(58) Field of Classification Search ............... None
See application file for complete search history.

(56) References Cited

U.S. PATENT DOCUMENTS

2002/0085493 A1* 7/2002 Pekkala et al. ............. 370/235
2002/0172195 A1* 11/2002 Pekkala et al. ............. 370/360

* cited by examiner

*Primary Examiner*—Bob A. Phunkulh
(74) *Attorney, Agent, or Firm*—Borden Ladner Gervais LLP

(57) ABSTRACT

A switch for use with an InfiniBand network. The switch includes a hub that redirects packets from a first InfiniBand device to a second InfiniBand device, a buffer that receives packets from the first InfiniBand device, and plurality of ports for transferring the data to the hub. A plurality of registers are coupled to the buffer for storing data from the packets. A switch network for selectively connecting the registers to the ports such that each register transfers a different portion of the data to a selected port.

11 Claims, 6 Drawing Sheets

| Stage/Time | +0 | +1 | +3 | +3 | +4 | +5 |
|---|---|---|---|---|---|---|
| Buffer | XFER_A READ W0 | XFER_B READ W0 | XFER_C READ W0 | XFER_D READ W0 | XFER_A READ W1 | XFER_B READ W1 |
| Stage 1 | XFER_A | XFER_B | XFER_C | XFER_D | XFER_A OUTPUT W0,Q2 | XFER_B OUTPUT W0,Q2 |
| Stage 2 | | XFER_A | XFER_B | XFER_C | XFER_D | XFER_A OUTPUT W0,Q3 |
| Stage 3 | | | XFER_A OUTPUT W0,Q0 | XFER_B OUTPUT W0,Q0 | XFER_C OUTPUT W0,Q0 | XFER_D OUTPUT W0,Q0 |
| Stage 4 | | | | XFER_A OUTPUT W0,Q1 | XFER_B OUTPUT W0,Q1 | XFER_C OUTPUT W0,Q1 |

APPARATUS AND METHODS FOR INCREASING BANDWIDTH IN AN INFINIBAND SWITCH

BACKGROUND OF THE INVENTION

InfiniBand™ is an emerging bus technology that hopes to replace the current PCI bus standard, which only supports up to 133 Mbps (Megabits per second) transfers, with a broader standard that supports a maximum shared bandwidth of 566 Mbps. InfiniBand is the culmination of the combined efforts of about 80 members that are led by Intel, Compaq, Dell, Hewlett-Packard, IBM, Microsoft and Sun Systems who collectively call themselves the InfiniBand Trade Association. The InfiniBand Trade Association has published a specification entitled: Infiniband™ Architecture Specification Release 1.0. The Specification spans three volumes and is incorporated herein by reference.

The InfiniBand Architecture (referred to herein as "IBA") is a first order interconnect technology, independent of the host operating system (OS) and processor platform, for interconnecting processor nodes and I/O nodes to form a system area network. IBA is designed around a point-to-point, switched I/O fabric, whereby end node devices (which can range from very inexpensive I/O devices like single chip SCSI or Ethernet adapters to very complex host computers) are interconnected by cascaded switch devices. The physical properties of the IBA interconnect support two predominant environments:

i. Module-to-module, as typified by computer systems that support I/O module add-in slots
 ii. Chassis-to-chassis, as typified by interconnecting computers, external storage systems, and external LAN/WAN access devices (such as switches, hubs, and routers) in a data-center environment.

IBA supports implementations as simple as a single computer system, and can be expanded to include: replication of components for increased system reliability, cascaded switched fabric components, additional I/O units for scalable I/O capacity and performance, additional host node computing elements for scalable computing, or any combinations thereof. IBA is scalable to enable computer systems to keep up with the ever-increasing customer requirement for increased scalability, increased bandwidth, decreased CPU utilization, high availability, high isolation, and support for Internet technology. Being designed as a first order network, IBA focuses on moving data in and out of a node's memory and is optimized for separate control and memory interfaces. This permits hardware to be closely coupled or even integrated with the node's memory complex, removing any performance barriers.

IBA uses reliable packet based communication where messages are enqueued for delivery between end nodes. IBA defines hardware transport protocols sufficient to support both reliable messaging (send/receive) and memory manipulation semantics (e.g. remote DMA) without software intervention in the data movement path. IBA defines protection and error detection mechanisms that permit IBA transactions to originate and terminate from either privileged kernel mode (to support legacy I/O and communication needs) or user space IBA can support bandwidths that are anticipated to remain an order of magnitude greater than current I/O media (SCSI, Fiber Channel, and Ethernet). These enable IBA to act as a common interconnect for attaching I/O media using these technologies. To further ensure compatibility across varying technologies, IBA uses JPv6 headers, supporting extremely efficient junctions between IBA fabrics and traditional Internet and Intranet infrastructures.

FIG. 1 is a block diagram of the InfiniBand architecture layers 100. IBA operation can be described as a series of layers 100. The protocol of each layer is independent of the other layers. Each layer is dependent on the service of the layer below it and provides service to the layer above it.

The physical layer 102 specifies how bits are placed on a wire to form symbols and defines the symbols used for framing (i.e., start of packet & end of packet), data symbols, and fill between packets (Idles). It specifies the signaling protocol as to what constitutes a validly formed packet (i.e., symbol encoding, proper alignment of framing symbols, no invalid or nondata symbols between start and end delimiters, no disparity errors, synchronization method, etc.).

The link layer 104 describes the packet format and protocols for packet operation, e.g. flow control and how packets are routed within a subnet between the source and destination. There are two types of packets: link management packets and data packets.

Link management packets are used to train and maintain link operation. These packets are created and consumed within the link layer 104 and are not subject to flow control. Link management packets are used to negotiate operational parameters between the ports at each end of the link such as bit rate, link width, etc. They are also used to convey flow control credits and maintain link integrity.

Data packets convey IBA operations and can include a number of different headers. For example, the Local Route Header (LRH) is always present and it identifies the local source and local destination ports where switches will route the packet and also specifies the Service Level (SL) and Virtual Lane (VL) on which the packet travels. The VL is changed as the packet traverses the subnet but the other fields remain unchanged. The Global Route Header (GRH) is present in a packet that traverses multiple subnets. The GRH identifies the source and destination ports using a port's Global ID (GID) in the format of an IPv6 address.

There are two CRCs in each packet. The Invariant CRC (ICRC) covers all fields which should not change as the packet traverses the fabric. The Variant CRC (VCRC) covers all of the fields of the packet. The combination of the two CRCs allow switches and routers to modify appropriate fields and still maintain an end to end data integrity for the transport control and data portion of the packet. The coverage of the ICRC is different depending on whether the packet is routed to another subnet (i.e. contains a global route header).

The network layer 106 describes the protocol for routing a packet between subnets. Each subnet has a unique subnet ID, the Subnet Prefix. When combined with a Port GUID, this combination becomes a port's Global ID (GID). The source places the GID of the destination in the GRH and the LID of the router in the LRH. Each router forwards the packet through the next subnet to another router until the packet reaches the target subnet. Routers forward the packet based on the content of the GRH. As the packet traverses different subnets, the routers modify the content of the GRH and replace the LRH. The last router replaces the LRH using the LID of the destination. The source and destination GIDs do not change and are protected by the ICRC field. Routers recalculate the VCRC but not the ICRC. This preserves end to end transport integrity.

While, the network layer 106 and the link layer 104 deliver a packet to the desired destination, the transport layer 108 is responsible for delivering the packet to the proper queue pair and instructing the queue pair how to process the packet's data. The transport layer 108 is responsible for segmenting an operation into multiple packets when the message's data payload is greater than the maximum transfer unit (MTU) of the path. The queue pair on the receiving end reassembles the data into the specified data buffer in its memory.

IBA supports any number of upper layers 110 that provide protocols to be used by various user consumers. IBA also defines messages and protocols for certain management functions. These management protocols are separated into Subnet Management and Subnet Services.

FIG. 2 is a block diagram of an InfiniBand subnet 200. An IBA subnet 200 is composed of endnodes 202, switches 204, a subnet manager 206 and, possibly one or more router(s) 208. Endnodes 202 may be any one of a processor node, an I/O node, and/or a router (such as the router 208). Switches 202 are the fundamental routing component for intra-subnet communication. The switches 202 interconnect endnodes 202 by relaying packets between the endnodes 202. Routers 208 are the fundamental component for inter-subnet communication. Router 208 interconnects subnets by relaying packets between the subnets.

Switches 204 are transparent to the endnodes 202, meaning they are not directly addressed (except for management operations). Instead, packets transverse the switches 204 virtually unchanged. To this end, every destination within the subnet 200 is configured with one or more unique local identifiers (LID). From the point of view of a switch 204, a LID represents a path through the switch. Packets contain a destination address that specifies the LID of the destination. Each switch 204 is configured with forwarding tables (not shown) that dictate the path a packet will take through the switch 204 based on a LID of the packet. Individual packets are forwarded within a switch 204 to an out-bound port or ports based on the packet's Destination LID and the Switch's 204 forwarding table. IBA switches support unicast forwarding (delivery of a single packet to a single location) and may support multicast forwarding (delivery of a single packet to multiple destinations).

The subnet manager 206 configures the switches 204 by loading the forwarding tables into each switch 204. To maximize availability, multiple paths between endnodes may be deployed within the switch fabric. If multiple paths are available between switches 204, the subnet manager 206 can use these paths for redundancy or for destination LID based load sharing. Where multiple paths exists, the subnet manager 206 can re-route packets around failed links by re-loading the forwarding tables of switches in the affected area of the fabric.

FIG. 3 is a block diagram of an InfiniBand Switch 300. IBA switches, such as the switch 300, simply pass packets along based on the destination address in the packet's LRH. IBA switches do not generate or consume packets (except for management packets). Referring to FIG. 1, IBA switches interconnect the link layers 104 by relaying packets between the link layers 104.

In operation the switch 300 exposes two or more ports 302a, 302b . . . 302n, between which packets are relayed. Each port 302n communicates with a packet relay 304 via a set of virtual lanes 306a though 306n. The packet relay 304 (sometimes referred to as a "hub" or "crossbar") redirects the packet to another port 302, via that port's associated with virtual lanes 306, for transmission based on the forwarding table associated with the packet relay 304.

During operation a 32-bit word arrives into an InfiniBand virtual link 306 at a port 302 of a switch 300 every clock cycle. To maximize bandwidth and minimize switch latency, it is desirable to be able to transfer data through the switch packet relay at the same frequency. In an 8 port switch, it is desirable to provide at least 3 output ports to the packet relay.

One method to enable the transfer data through the switch packet relay at the same frequency is to run the packet relay at 3× the input frequency. However, this requires that the RAM used for data storage must be able to read at the packet relay frequency rather than the slower input port frequency, requiring larger RAM (and more manufacturing cost). Further, either the process used to fabricate the packet relay must support the increased frequency or complicated differential circuitry must be added to handle the increase in frequency of the packet relay. Either option results in increased costs. Finally, simply increasing the frequency of the packet relay actually complicates the transfer of data by preventing the use of a pure cut-through mode, where a packet begins transferring through a packet relay while it is still being received at the input port. In fact, at least ⅔ of the packet must be received prior to the output transfer beginning.

Another method to enable the transfer data through the switch packet relay at the same frequency is to use a 1 input, 3-output RAM. However, the size of multi-port RAMs usually scale in direct ration to their number of ports. Hence the area of the memory array proportion of a 1-input, 3-output RAM is most likely 3× the area of a single input, single output RAM.

Thus, the Inventors of the present invention have recognized a need for methods and apparatus that enable the transfer data through the switch packet relay at the same frequency at which the data is received that minimizes RAM requirements and reduces the physical space of the apparatus.

BRIEF DESCRIPTION OF THE DRAWINGS

An understanding of the present invention can be gained from the following detailed description of the invention, taken in conjunction with the accompanying drawings of which:

FIG. 7 is a chart illustrating the transfer of data in accordance with a preferred embodiment of the present invention.

DETAILED DESCRIPTION

Figure 1:
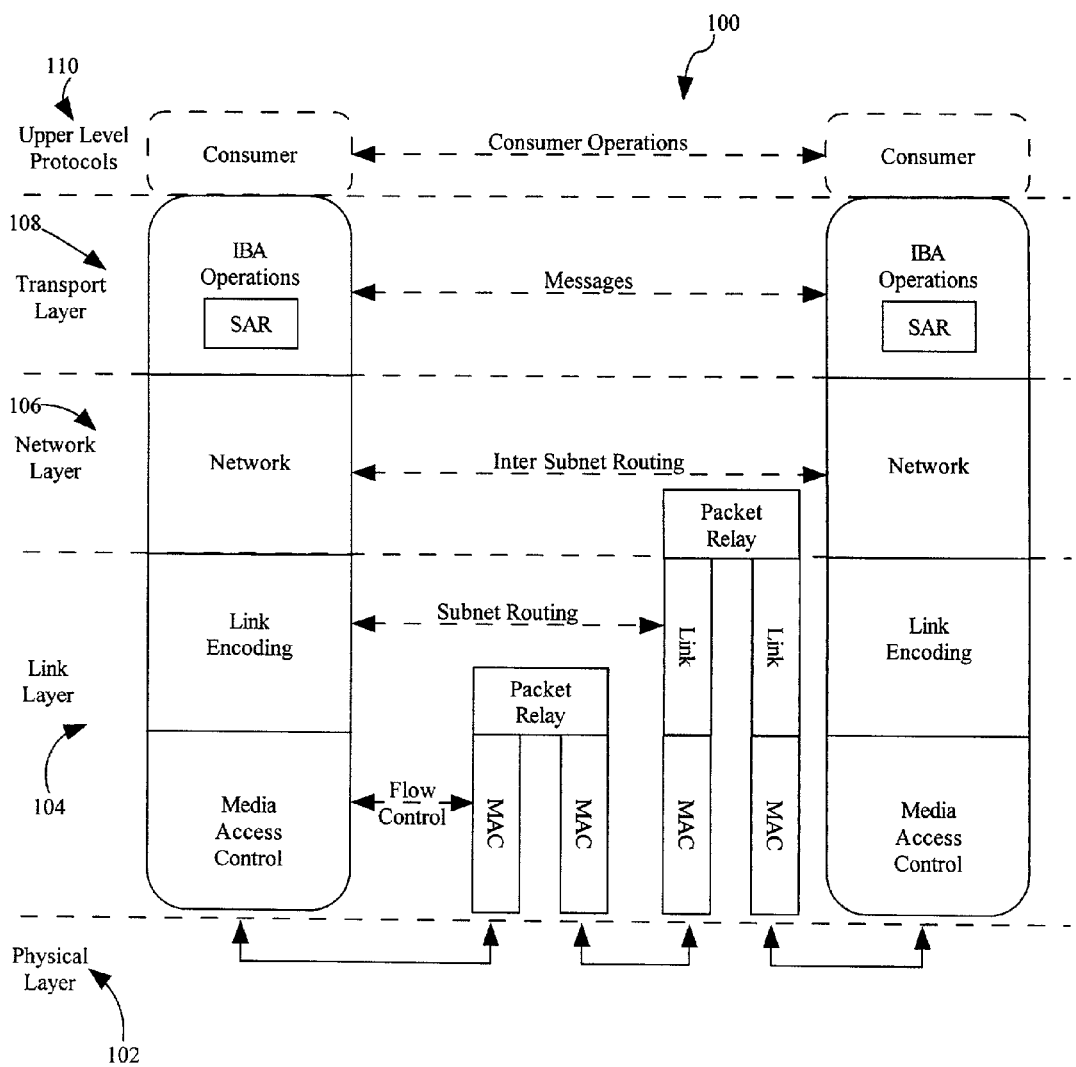
FIG. 1 is a block diagram of the InfiniBand architecture layers.
Figure 2:
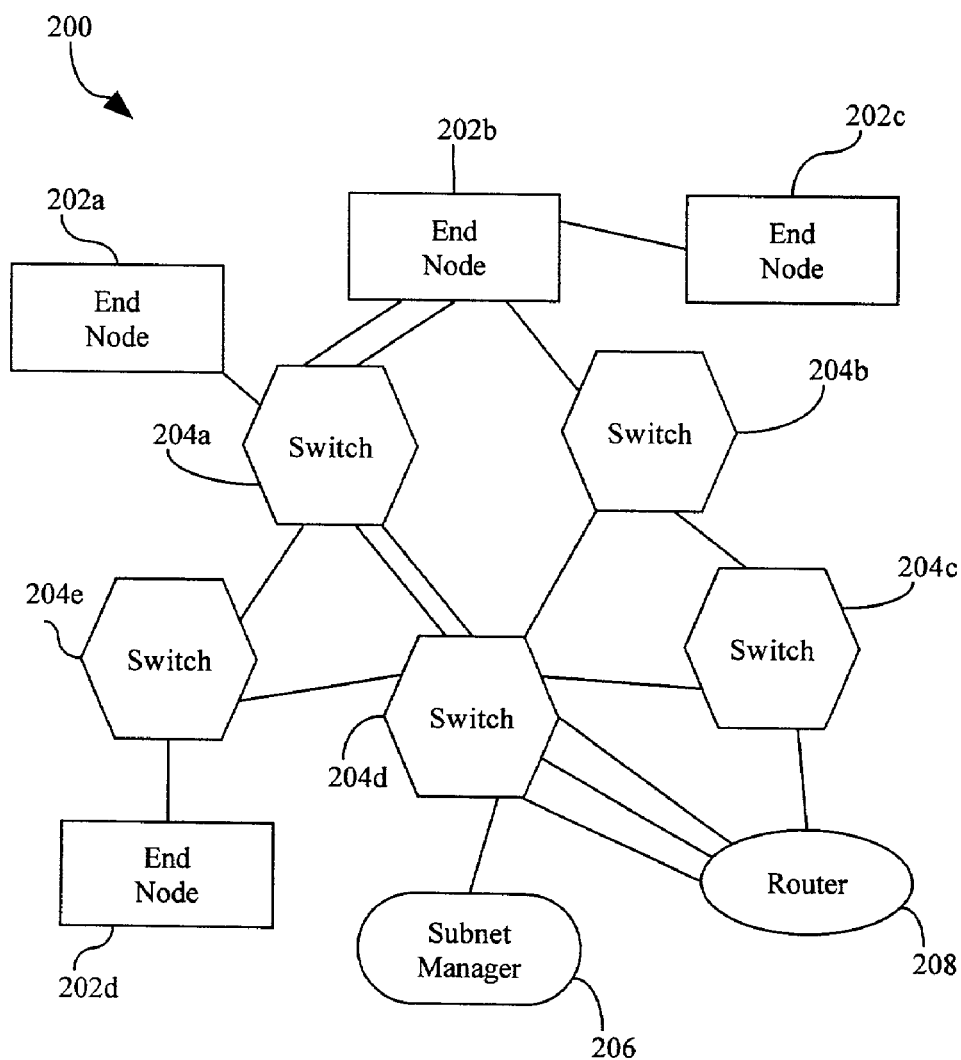
FIG. 2 is a block diagram of an InfiniBand subnet.
Figure 3:
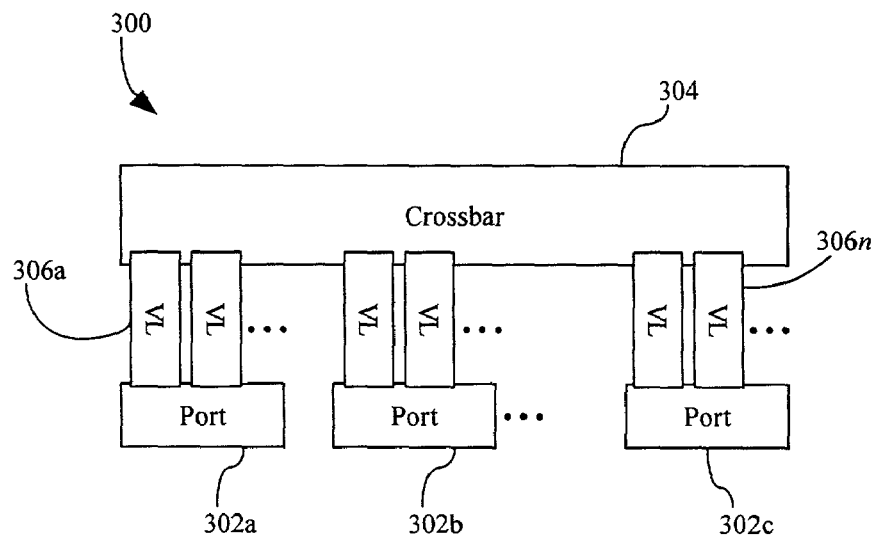
FIG. 3 is a block diagram of an InfiniBand switch.

Reference will now be made in detail to the present invention, examples of which are illustrated in the accompanying drawings, where in like reference numerals refer to like elements throughout.

In general, the present invention relates to apparatus and method steps embodied in software and associated hardware including computer readable medium, configured to store and/or process electrical or other physical signals to generate other desired signals. In general, the method steps require physical manipulation of data representing physical quantities. Usually, though not necessarily, such data takes the form of electrical or magnetic signals capable of being stored, transferred, combined, compared or otherwise manipulated. Those of ordinary skill in the art conveniently refer to these signals as "bits", "values", "elements", "symbols", "characters", "images", "terms", "numbers", or the like. It should be recognized that these and similar terms are to be associated with the appropriate physical quantities they represent and are merely convenient labels applied to such quantities.

Accordingly, the detailed description which follows contains descriptions of methods presented in terms of methods that are described using symbolic representations of data transfixed in a computer readable medium such as RAM, ROM, CD-ROM, DVD, hard disk, floppy disk, data communication channels such as USB, SCSI, or FIREWIRE and/or a network such as IBA, the Internet, or a LAN. These descriptions and representations are the means used by those skilled in the art effectively convey the substance of their work to others skilled in the art.

The term data processing device encompasses any of a variety of devices that are responsive to data and either perform some operation in response to the receipt thereof or modify the data in accordance with internal or external instructions that may be stored separately from the data processing devices or encoded into the structure of the data processing device. The term "method" is generally used to refer to a series of operations performed by a data processing device and, as such, encompasses such terms of art as "routine," "software," "program," "objects," "functions," "subroutines," and "procedures."

Unless otherwise noted, the methods recited herein may be enabled in one or more integrated circuits configured to perform the method steps taught herein. The required functional structures for such circuits appear in the description given below. Data processing devices that may be configured to perform the functions of the present invention include those manufactured by such companies as AGILENT and CISCO as well as other manufacturers of networking devices.

Figure 4:
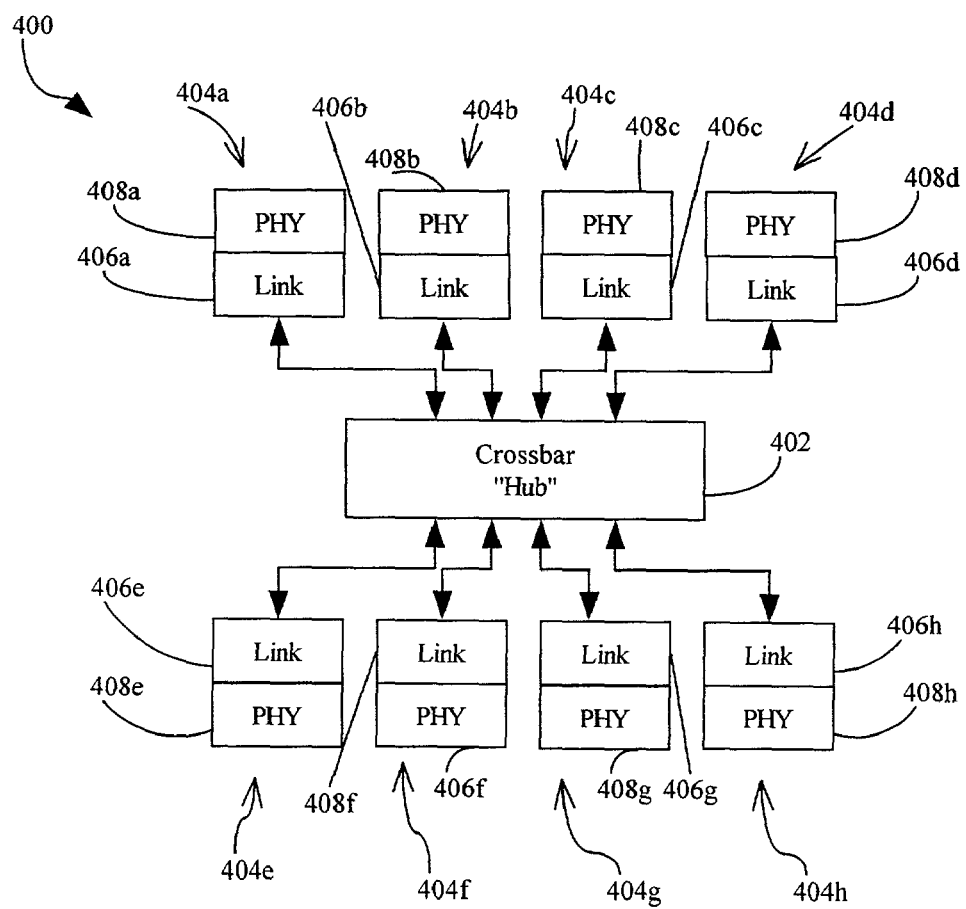
FIG. 4 is a block diagram of an InfiniBand switch in accordance with a preferred embodiment of the present invention.

FIG. 4 is a conceptual block diagram of a switch 400 in accordance with the preferred embodiment of the present invention. It will be appreciated by those of ordinary skill in the relevant arts that the switch 400, as illustrated in FIG. 4, and the operation thereof as described hereinafter is intended to be generally representative of such systems and that any particular switch may differ significantly from that shown in FIG. 4, particularly in the details of construction and operation. As such, the switch 400 is to be regarded as illustrative and exemplary and not limiting as regards the invention described herein or the claims attached hereto.

The switch 400 generally comprises a crossbar 402 (also referred to as a "hub") to which a plurality of ports 404a through 404h are connected. Each port 404 of the switch 400 generally comprises a link block 406 and a physical block 408 ("PHY"). In perhaps the preferred embodiment the crossbar 402 is a ten port device with two ports being reserved for management functions. FIG. 4 only portrays eight ports 404a through 404h for clarity of presentation.

The PHY block 408 primarily serves as a serialize to de-serialize ("SerDes") device. The link block 406 performs several functions, including the input buffer, receive ("RX"), transmit ("TX"), and flow control. The input virtual lanes (VLs) are physically contained in input buffers (not shown) of the link block 406. Other functions that may be performed by the link block 406 include: integrity checking, link state and status, error detecting and recording, flow control generation, and output buffering.

The crossbar 402 is preferably implemented as a sparsely populated data path structure. In essence, the crossbar 402 acts as a distributed MUX for every possible input to each output port. The crossbar 402 is preferably combinatorial, and capable of completing the switching process for one 32-bit word within one 250 MHz system clock period (4.0 ns).

Figure 5:
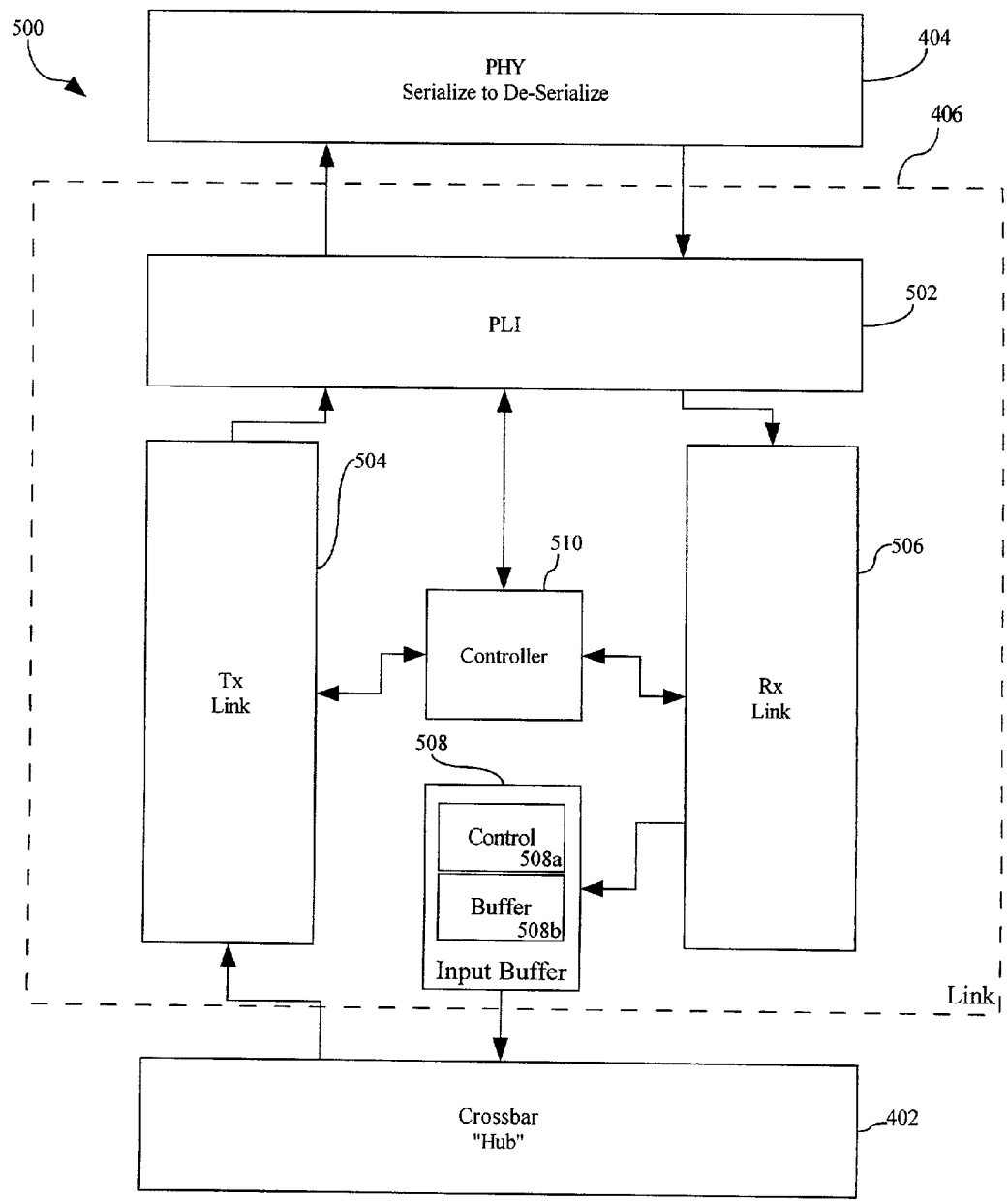
FIG. 5 is a block diagram of an InfiniBand switch in accordance with a preferred embodiment of the present invention

FIG. 5 is a block diagram of an InfiniBand switch 500 in accordance with a preferred embodiment of the present invention. More specifically, FIG. 5 is a more detailed view of the switch 400 shown in FIG. 4 providing more detail of the link block 406. It will be appreciated by those of ordinary skill in the relevant arts that the switch 500, as illustrated in FIG. 5, and the operation thereof as described hereinafter is intended to be generally representative of such systems and that any particular switch may differ significantly from that shown in FIG. 5, particularly in the details of construction and operation. Further, only those functional elements that have bearing on the present invention have been portrayed so as to focus attention on the salient features of the inventive features. As such, the switch 500 is to be regarded as illustrative and exemplary and not limiting as regards the invention described herein or the claims attached hereto.

The link block 406 generally comprises a phy-link interface 502 (the "PLI") connected to a transmit link 504 (the "Tx Link") and a receive link (the "Rx Link") 506. The Rx link 506 outputs to input buffer 508 for transfer of data to the crossbar 402. A controller 510, primarily comprising registers, controls the operation of the transmit and receive links 504 and 506.

The PLI 502 connects transmitter and receiver portions of the PHY block 404 to the link block 406's Tx Link 504 and Rx Link 506. The receive portion of the PLI 502 realigns the data from the PHY block 404 and detects special characters and strings of characters, such as a start of packet (SOP) indicator, from the receiver data stream.

The Rx Link 506 accepts packet data from the PLI 502, performs certain checks, and passes the data on to the input buffer 508. The Tx Link 504 sends data packets that are ready to transfer from the Hub 402 to the PHY block 404, through the PLI 502. In doing so, the Tx Link 504 realigns the data, adds the placeholder for the start/end packet control characters, and calculates and inserts the VCRC field. In addition to data packets, the Tx Link 504 also accepts and transmit flow control link packets from a flow control state machine (not shown).

Figure 6:
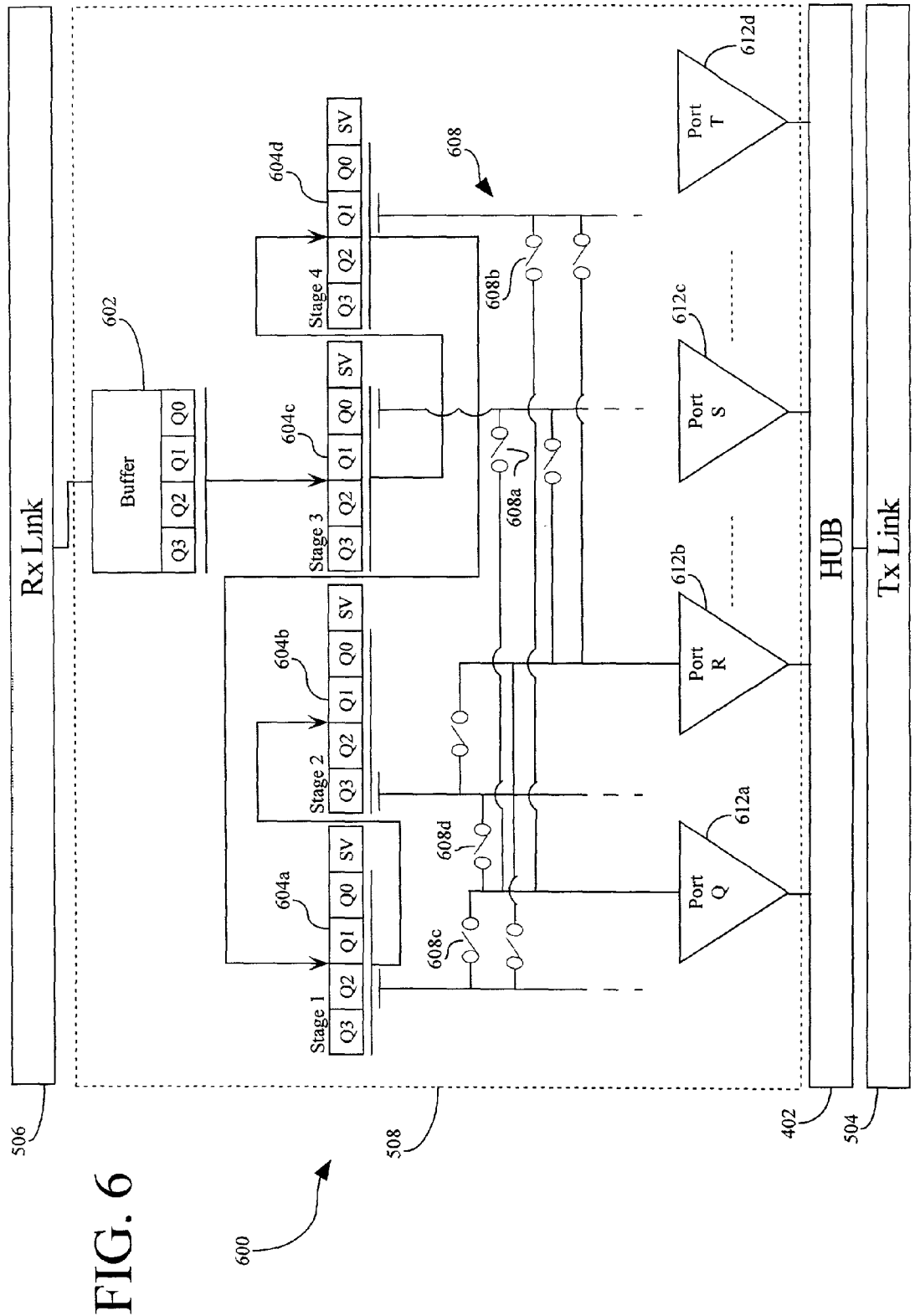
FIG. 6 is a block diagram of an InfiniBand switch in accordance with a preferred embodiment of the present invention.

FIG. 6 is a block diagram of an InfiniBand switch 600 in accordance with a preferred embodiment of the present invention. More specifically, FIG. 6 highlights the structure of the buffer 508 in FIG. 5 with respect to the present invention. The Rx link 506 transfers data to a buffer 602. The present invention concatenates four 32-bit InfiniBand words into a single word having a width of 128-bits made up of four 32-bit quads. Thus, to transfer a 32-bit word through the hub 402 every cycle, the buffer 602 only needs to be read once every 4 cycles. The buffer 602 is connected to a series of registers 604a–604d, each 128-bits wide which act in a pipeline manner to multiplex four words (the 128-bit words of the present invention) out to four ports 612a–612d. A switch network 608 (only partially shown for clarity) facilitates the transfer of data from the registers 604 to the ports 612a–612d. The ports 612 transfer data to the hub 402 that in turn transfers data to the Tx link 504.

In use, each register 604 transfers one quad of the word currently in memory to the switch network 608. Subsequently, each register 604 transfers it's content to a register 604 in the next stage of the pipeline. The register 604*a* is considered the first stage and is responsible to transmitting quad 2 of each word to the switch network 608 and forwarding the entire word to register 604*b* which constitutes the second stage. Register 604*b* is, in turn, responsible for transmitting quad 3 of the word to the switch network 608. As the final register in the pipeline, register 604*b* does not forward it's word. Register 604*c* constitutes the third stage and receives words directly from the buffer 602, transfers quad 0 to the switch network 608 and forwards it's word to the register 604*d* constituting the fourth stage. Register 604*d* transfers quad 1 to the switch network 608 and forwards it's word to the register 604*a* (stage 1).

Overall, the buffer 508 is preferably constructed to function like a state machine. That is the buffer 508 is responsive to a set of values (typically implemented as a so-called state variable or "SV") that cause the elements of the buffer 508 to perform in a certain manner depending on the state of the values. In perhaps the preferred embodiment, a state variable "SV" is appended to each word, the switch network 610 is responsive to the state variable and opens/closes switches to ensures that each quad output by a register 604 is sent to a port 612 associated with the word of the quad. The SV can also be used to pass additional information including error messages.

For example, take the case of a single word passing through the pipeline of registers 604. The word starts at stage three in the register 604*c* where the switch network 608 might connect the register 604*c* to the port Q 612*a* by closing switch 608*a*. In a next cycle, the switch network 608 would open switch 608*a* and close 608*b* to connect the stage four register 604*d* to the port Q 612*a*. In a subsequent cycle the switch network 608 would open the switch 608*b* and close the switch 608*c* to connect the stage 1 register 604*a* to the port Q 612*a*. Finally, in a next cycle, the switch network 608 would open the switch 608*c* and close the switch 608*d* to connect the stage 2 register 604*b* to the port Q 612*a*.

FIG. 7 is a chart 700 illustrating the transfer of data in accordance with a preferred embodiment of the present invention. The chart 700 shows the contents and actions of the buffer 602 and the registers 604 through five stages. XFER_A, XFER_B, XFER_C, and XFER_D signify four different packets to be transferred by the buffer 508 to the hub 402.

In general, it take two clock cycles to transfer data from the buffer 602 to the third stage register 604*c*. In a leading edge of a first clock cycle, the read address is supplied to the buffer 602. The data will be available to be read at the leading edge of the next clock cycle and be transferred by the leading edge of the subsequent clock cycle. When initiating a transfer the hub 402 will provide the initial address. For subsequent reads, the buffer 602, preferably using a state machine (not shown) will calculate the address. FIG. 7 portrays the transfer of a word (W0) of packet A (XFER_A) and portions of words of packets B (XFER_B), C (XFER_C), and D (XFER_D) in the context of an ongoing transfer.

At time +0 the address of W0 of packet A is provided to the buffer. At this time stage 1 will contain a prior word of packet A. At time +1, the buffer is provided with a read address for W0 of packet B. Stage 1 will now contain a prior word of packet B, while stage 2 contains the prior word of packet A. At time +2, the buffer is provided with a read address for W0 of packet C. Stage 1 will now contain a prior word of packet C, while stage 2 contains the prior word of packet B. At this time stage three will have received W0 of packet A. Accordingly, Q0, W0 of packet A is transferred, through the switch network 608, to the port assigned to packet A, such as port Q 612*a*.

At time +3, the buffer is provided with a read address for W0 of packet D. Stage 0 will now contain a prior word of packet D and stage 2 a prior word of packet C. W0 of packet B is now loaded into stage 3. Accordingly, Q0, W0 of packet B is transferred through the switch network 608 to the port assigned to packet B, such as port R 612*b*. Also at time +3, W0 of packet A has been transferred to stage 4 and W0, Q1 of packet A is transferred to the appropriate port, using the prior example: port Q 612*a*.

At time +4, the buffer is provided with a read address for W1 of packet A. Stage 0 will now contain W0 of packet A and accordingly Q2 thereof will be transferred to the appropriate port (port Q 612*a*). Stage 2 now contains a prior word of packet D. W0 of packet C is now loaded into stage 3 causing Q0, W0 of packet C to be transferred through the switch network 608 to the port assigned to packet B, such as port S 612*c*. Also at time +4, W0 of packet B has been transferred to stage 4 and W0, Q1 of packet B is transferred to the appropriate port (port R 612*b*).

At time +5, the buffer is provided with a read address for W1 of packet B. Stage 0 will now contain W0 of packet B and accordingly Q2 thereof will be transferred to the appropriate port (port R 612*b*). Stage 2 now contains W0 of packet A and the final quad, Q3, is transferred to the appropriate port (port Q 602*a*). W0 of packet D is now loaded into stage 3 causing Q0, W0 of packet D to be transferred through the switch network 608 to the appropriate port (port T 612*d*). Also at time +4, W0 of packet C has been transferred to stage 4 and W0, Q1 of packet C is transferred to the appropriate port (port S 612*c*).

In subsequent iterations, W1 of each of the packets (of which A and B have already been requested) will be loaded into the pipeline and transferred to the appropriate ports 612. The methods and apparatus portrayed in FIGS. 6 and 7 allow the emulation of a 1 input 4 output memory while avoiding the use of an actual 1 input 4 output memory with the physical requirements thereof. Although an embodiment of the present invention has been shown and described, it will be appreciated by those skilled in the art that changes may be made in such embodiment without departing from the principles and spirit of the invention, the scope of which is defined in the claims and their equivalents.

For example, while the registers 604*a* through 604*d* are all shown to be of the same size, they may be of varying sizes. While the third stage register 604*c* (or any of the registers that receives data from the buffer 602) should be able to store the entire 128-bit word (and SV is that is the used mechanism for controlling the switch network 608), subsequent registers need not store those quads that have been passed through to their respective ports 612.

Further, while the present invention has been described with respect to a one input-four output configuration, throughput analysis has shown that a three output system is sufficient for an eight or sixteen port switch. Accordingly, it may be preferable to implement the present invention as a three-output system resulting in a simplified switch network and substantial cost savings.

What is claimed is:

1. A switch for use with an InfiniBand network, the switch comprising:
   a hub that redirects packets from a first InfiniBand device to a second InfiniBand device;
   a buffer that receives packets from the first InfiniBand device;
   a plurality of registers coupled to the buffer for storing data from the packets;

a plurality of ports for transferring the data from the registers to the hub; and a switch network for selectively connecting the registers to the ports such that each register transfers a different portion of the data to a selected port.

2. A switch, as set forth in claim 1, wherein the plurality of registers are connected in a series such that a first register receives a word from the buffer and transfers the word to a next register.

3. A switch, as set forth in claim 2, wherein the buffer concatenates words of the packets into larger words and wherein at least the first register can store the larger word.

4. A switch, as set forth in claim 3, wherein control data is appended to the larger word that controls the operation of the switch network.

5. A switch for use with InfiniBand network, the switch comprising:

a plurality of ports for transferring packets to a hub;

a buffer that receives the packets in 32-bit words and concatenates a plurality of the 32-bit words to form a large word;

a pipeline, comprising a plurality of stages, connected to the buffer, the pipeline receiving large words from the buffer and at each of a plurality of stages transferring a portion of a large word to an assigned port.

6. The switch, as set forth in claim 5, wherein the pipeline can hold a plurality of large words.

7. The switch, as set forth in claim 6, wherein the pipeline can hold at least three words.

8. The switch, as set forth in claim 5, further comprising:

a switch network connected to each of the stages that connects a stage to a port associated with the packet currently in the stage.

9. The switch, as set forth in claim 8, the switch network is responsive to a state variable.

10. The switch, as set forth in claim 9, wherein each large word has an associated state variable.

11. The switch, as set forth in claim 5, wherein the concatenates at least three 32-bit words to form a large word.

* * * * *